United States Patent [19]

Duncan et al.

[11] 3,836,875

[45] Sept. 17, 1974

[54] MICROWAVE LIMITER HAVING VARIABLE CAPACITANCE DIODE IN TUNED CAVITY

[75] Inventors: James Ritchie Duncan, Dundee, Scotland; Colin Donald Hannaford, Milnthorpe, England

[73] Assignee: Ferranti Limited, Hollinwood, England

[22] Filed: Jan. 17, 1973

[21] Appl. No.: 324,326

[52] U.S. Cl. .................................. 333/17, 333/83 R

[51] Int. Cl.... H03g 11/04, H03g 11/02, H01p 1/22

[58] Field of Search ........ 333/17, 17 L, 82 B, 83 R; 334/14, 15; 307/237

[56] References Cited

UNITED STATES PATENTS

| | | | |
|---|---|---|---|
| 3,423,701 | 1/1969 | Käch | 333/83 R |
| 3,506,933 | 4/1970 | Giarola et al. | 333/17 L |
| 3,703,689 | 11/1972 | McAtee | 333/82 B |

*Primary Examiner*—Paul L. Gensler

*Attorney, Agent, or Firm*—Cameron, Kerkam, Sutton, Stowell & Stowell

[57] ABSTRACT

A microwave-frequency power limiting device comprises a voltage-sensitive reactance arranged to form a tuned circuit having a resonant frequency dependent upon the power applied to the device. The tuned circuit is coupled to an input transmission line by a step-up transformer.

5 Claims, 5 Drawing Figures

PATENTED SEP 17 1974 3,836,875

MICROWAVE LIMITER HAVING VARIABLE CAPACITANCE DIODE IN TUNED CAVITY

This invention relates to microwave devices, and in particular to power-limiting devices.

Microwave-frequency power limiting devices are commonly used in radar systems to prevent receiver damage due to power leakage through the usual TR cell. Such a limiter is required to have low insertion loss to the weak received echo signals and to provide a high attenuation to any high power transmitter signal leakage past the TR cell.

Power limiting devices arranged to perform this function are known. In their simplest form such devices comprise a transmission line having a variable-capacitance diode connected across it, together with the necessary matching components. Such a device is essentially a simple filter with its cut-off frequency determined by the capacitance of the diode. This capacitance varies as the power applied to the transmission line varies. Such a device is fairly satisfactory at frequencies up to about 4GHz, but at higher frequencies problems arise due to series resonance of the diode and matching components. These problems may be overcome by the use of a quarter-wave stub containing the diode. This forms a series resonant circuit at low power and allows signals to pass along the line, but at high power the diode and stub form a parallel resonant circuit which causes rejection of the signals on the line.

As already stated, limiters of the type referred to above are, in effect, variable-frequency filters, and as such the transmission bandwidth and limiting characteristics are difficult to control. In addition a relatively high input power level is necessary to cause the device to operate in its highly-attenuating mode.

It is an object of the invention to provide a microwave-frequency power limiting device having a better limiting characteristic than known devices, and requiring a lower input power to ensure full limiting operation.

According to the present invention there is provided a microwave-frequency power-limiting device arranged to be connected between an input transmission line and an output transmission line and comprising a voltage-sensitive reactance connected to form a tuned circuit the resonant frequency of which is dependent upon the power applied to the input transmission line, the tuned circuit being coupled to the input transmissions line by means of a transformer having a step-up transformation ratio and to the output transmission line by coupling means.

The invention will now be described with reference to the accompanying drawings, in which.

Figure 1:
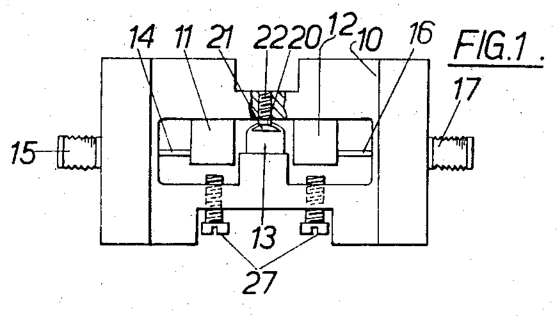
FIGS. 1 and 2 show plan and side elevation views of a limiter according to a first embodiment of the invention.
Figure 2:
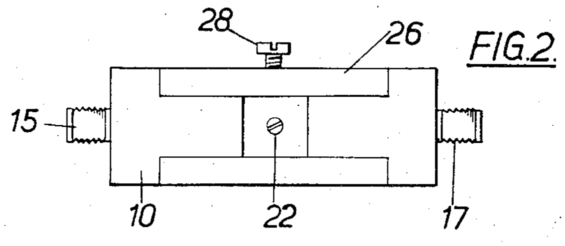

FIGS. 1 and 2 show the arrangement of a limiter in the form of a coaxial transmission-line component. Basically the limiter is in the form of a hollow metal box 10 inside which are located three parallel posts 11, 12 and 13. The two outer posts 11 and 12 are attached to one side of the box and project towards the opposite side of the box. To the free end of post 11 is attached the inner conductor 14 of an input coaxial cable connector 15. Similarly, to the free end of post 12 is attached the inner conductor 16 of output coaxial cable connector 17. The third, central, post 13 is attached to the side of the box opposite to that carrying the posts 11 and 12. A variable-capacitance diode 20 is located by means of a spring contact 21 and a stud 22 between the free end of post 13 and the adjacent side of the box, as shown in FIG. 1.

The dimensions of the box are such that the base of the central post 13 is spaced a quarter of a wavelength away from the opposite side of the box. This enables the centre post to form a resonant circuit when in operation. It may be necessary, as shown in FIG. 1 to form a pedestal on which to mount the post 13. The side panels 26 of the limiter (the nearer one of which is removed in FIG. 1) must be in good electrical contact with the block 10.

Figure 3:
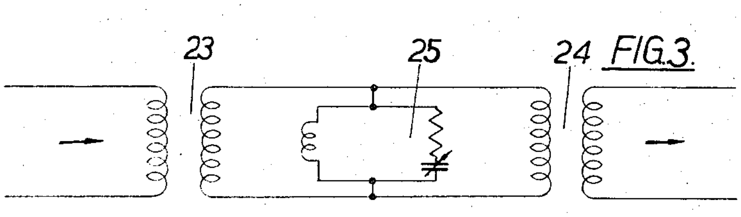
FIG. 3 is an equivalent circuit of the limiter of FIGS. 1 and 2.

The equivalent circuit of the device is shown in FIG. 3. The input post 11 and the central post 13 form a step-up input transformer 23 between the impedance of the input line and the impedance as seen by the resonant circuit, the transformation ratio of the transformer being determined by the diameter of the input post 11 and the spacing between it and the central post 13. Similarly the central post 13 and the output post 12 form a step-down transformer 24 of the same ratio, coupling the resonant circuit to the output line so that the limiter is matched to both the input and the output coaxial lines.

The central post 13 and the diode 20 effectively form a parallel tuned circuit as stated above, the resonant frequency under low-signal-power conditions being designed to be in the operating band of the associated equipment. The impedance of the parallel tuned circuit is resistive and is determined by the resistance and capacitance of the diode, whilst the capacitance varies in dependence upon the voltage appearing across it.

In operation, the voltage across the input line is increased by the step-up ratio of the "input transformer" 23 formed between posts 11 and 13. At low power levels the parameters of the device are chosen so that the inductance and capacitance are at resonance at the required operating frequency. Hence the losses introduced by the device are essentially the resistive losses of the parallel tuned circuit 25. As the signal power increases, so the voltage across the diode increases. The resultant increase in diode capacitance causes the resonant frequency to change and produces a mis-match across the input transformer 23. This causes the signal power to be reflected back along the input line so that it does not reach the "output transformer" 24.

The provision of the step-up transformer 23 enables the voltage threshold of the limiter to be lower than would be the case without the transformer. The low power response of the limiter may be adjusted by tuning screws. These may be located in line with the ends of the posts 11 and 12 as shown at 27 in FIG. 1. Any tuning screw required adjacent to the central post 13 will have to be located in one side panel 26 of the limiter, projecting towards the side of the post as shown at 28 in FIG. 2.

The limiter described above will usually be made of a material such as brass, though the diode contact on the central post 13 may be gold plated.

Figure 4:
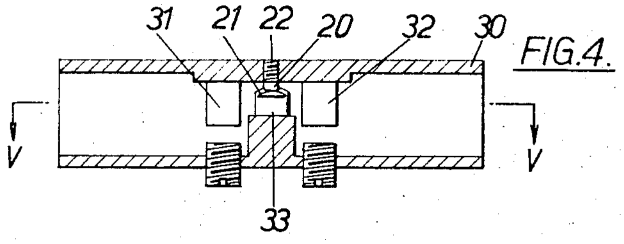
FIGS. 4 and 5 show sectional side elevation and plan views of a limiter according to a second embodiment of the invention.
Figure 5:
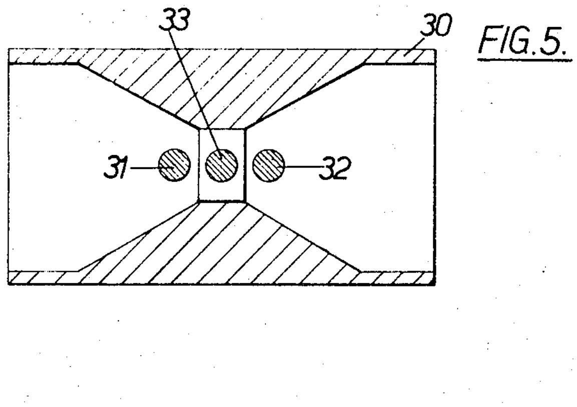

The device shown in FIG. 1 and 2 and described above is for use in a coaxial transmission line. The limiter may also be made as a waveguide component, as shown in FIGS. 4 and 5. FIG. 4 shows a section through the rectangular waveguide showing the narrower dimension of the waveguide and FIG. 5 shows sectional plan view along the line V — V of FIG. 4, showing the wider dimension. The three posts 31, 32 and 33 are provided as in the previous embodiment, but are mounted within the waveguide 30. The wider dimension of the waveguide is tapered down towards the central post as shown in FIG. 5 so as to couple all the energy in the wave-guide into the posts 31 and 32. The arrangement of the posts themselves is exactly as previously described, with the diode 20 located between screw 22 and spring 21 on centre post 33. The dimensions and spacing of the posts are the same as in the first embodiment. The outer posts 31 and 32 are outside the narrowest part of the waveguide.

The waveguide limiter operates in exactly the same way as the coaxial line component described above and has the same effect.

The two embodiments described above are capable of being modified in a number of ways. It is, for example, possible to increase the number of posts in order to use more than one diode. In such a case the insertion loss would be increased, which could be a disadvantage. The two outermost posts still form the input and output "transformers" as before, to match the device to the input and output lines. As already stated the transformation ratio may be varied by appropriate design of the limiter.

The limiters shown have alternate posts attached to opposite sides of the "box." As an alternative it is possible to form a comb-like structure in which all the posts are secured to the same side of the "box."

The diode has been shown in the above embodiments as being in contact with the free end of the central post. If it was desired to raise the threshold level the point of contact between the diode and the post may be moved away from the end of the post. However, this counters the effect of the step-up input transformation which is one of the features of the invention.

If the output transmission line is made to have an impedance equal to the impedance of the resonant circuit, then the output transformer is not required for matching purposes. However, the output post is still necessary to couple the output of the limiter into the output line, and hence the post forms, in effect, part of a transformer having a one-to-one ratio. Equally any other required transformation ratio may be provided.

All the above description has referred to variable capacitance diodes as the variable reactance. However, it is possible to use instead ferro-electric materials having a variable dielectric constant property, with similar results.

What we claim is:

1. A microwave-frequency power-limiting device arranged to be connected between an input transmission line and an output transmission line comprising a cavity containing at least three parallel posts forming a tuned circuit the resonant frequency of which is dependent upon the power applied to the input transmission line, the tuned circuit being coupled to the input transmission line by means of a transformer having a step-up transformation ratio and to the output transmission line by coupling means, the parallel posts also forming the transformer and the coupling means.

2. A device as claimed in claim 1 in which the tuned circuit includes a voltage-sensitive reactance.

3. A device as claimed in claim 2 in which the voltage-sensitive reactance is a variable-capacitance diode connected to one of the posts other than the outermost posts.

4. A device as claimed in claim 1 for use with a coaxial transmission line, in which the inner conductors of the input and output transmission lines are connected to separate ones of the outermost posts.

5. A device as claimed in claim 1 for use with a waveguide transmission line, in which all except the outermost posts are located within a portion of the waveguide of reduced dimensions.

* * * * *

050
9)

UNITED STATES PATENT OFFICE
CERTIFICATE OF CORRECTION ent No. 3,836,875 Dated September 17, 1974 entor(s) James Ritchie Duncan et al.

It is certified that error appears in the above-identified patent
l that said Letters Patent are hereby corrected as shown below:

Cover page, after item [21] insert:

--[30] Foreign Application Priority Data

Jan. 22, 1972 Great Britain 3130/72--.

Signed and sealed this 17th day of December 1974.

(SEAL)
Attest:

McCOY M. GIBSON JR.
Attesting Officer

C. MARSHALL DANN
Commissioner of Patents